L. A. THORNBURG.
GLASS MAKING PROCESS AND APPARATUS.
APPLICATION FILED NOV. 20, 1909.
1,176,498.
Patented Mar. 21, 1916.
2 SHEETS—SHEET 2.
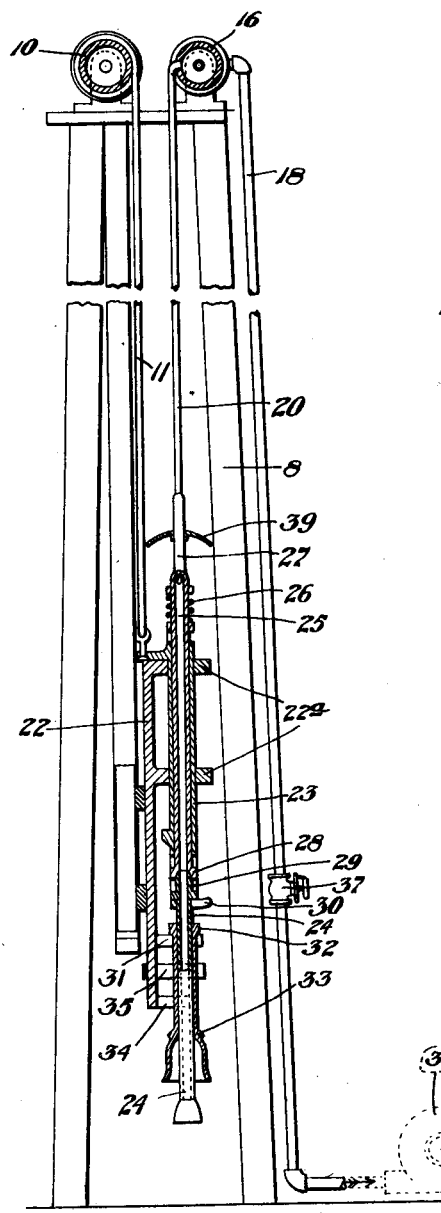
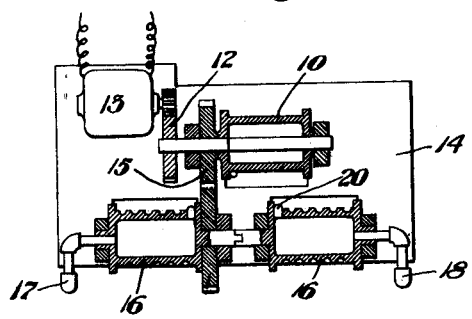
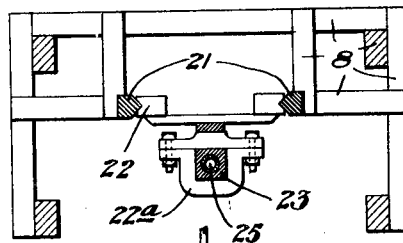
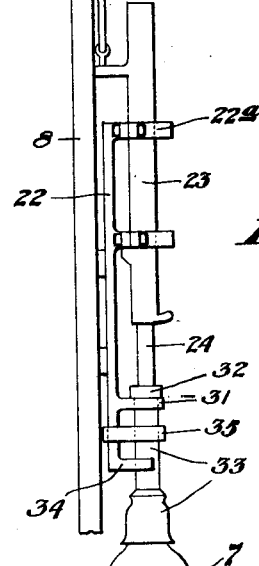

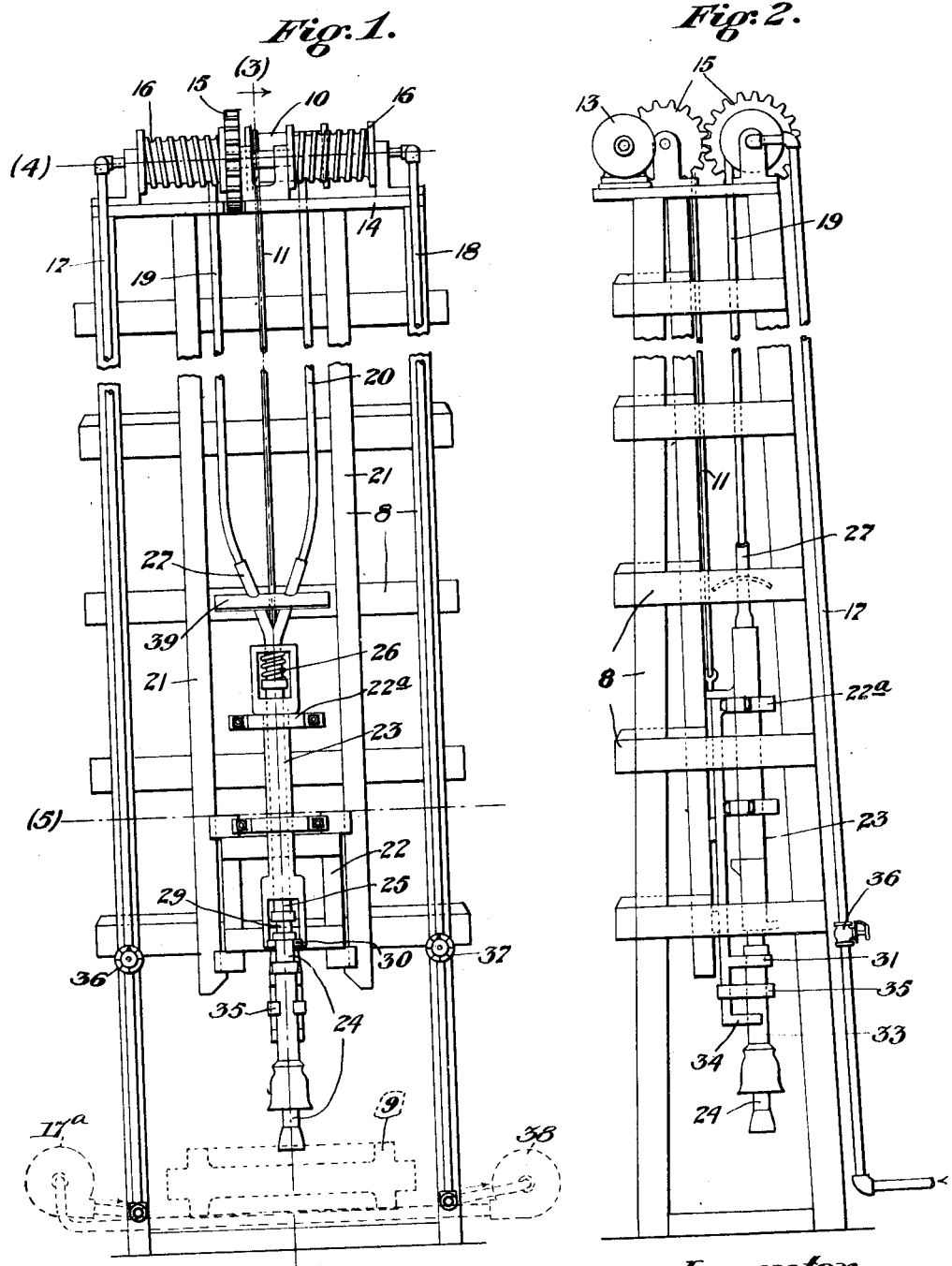

UNITED STATES PATENT OFFICE.

LINCOLN A. THORNBURG, OF ARNOLD, PENNSYLVANIA, ASSIGNOR TO AMERICAN WINDOW GLASS MACHINE COMPANY, OF PITTSBURGH, PENNSYLVANIA, A CORPORATION OF NEW JERSEY.

GLASS-MAKING PROCESS AND APPARATUS.

1,176,498.  Specification of Letters Patent.  Patented Mar. 21, 1916.

Application filed November 20, 1909. Serial No. 529,039.

*To all whom it may concern:*

Be it known that I, LINCOLN A. THORNBURG, a citizen of the United States, residing at Arnold, in the State of Pennsylvania, have invented certain new and useful Improvements in Glass-Making Processes and Apparatus, of which the following is a specification.

My invention relates to the art of drawing hollow glass articles such as the cylinders used in making window glass. Its primary objects are to improve the manipulation of the air used for distending the cylinder during draw; to more conveniently retain the heat at the joint of the neck with the blow pipe, to more economically handle the air used for blowing, and to generally improve the construction and operation of cylinder drawing and blowing apparatus.

I have illustrated the invention in the accompanying drawing in which—

Figure 1 is a front elevation of the assembled apparatus, and Fig. 2 is a side elevation of the same. Fig. 3 is a central vertical section on the line (3) in Fig. 1. Fig. 4 is a horizontal section on the line (4) of Fig. 1, and Fig. 5 is a horizontal section on the line (5) of Fig. 1. Fig. 6 is a partial side elevation showing the blow-pipe in elevated condition and an attached head of a cylinder 7.

The most successful practice in drawing cylinders or rollers of glass for window glass making, has been the Lubbers process in which the air is constantly admitted into the cylinder during the draw, and is somewhat self-regulating by allowing a constant escape from an opening in the air passage somewhere back of the cylinder. The conditions of air in the cylinder are very difficult to control, and it will be understood that it is not a mere matter of introducing a regular amount of air to keep a constant pressure in the cylinder, for the contraction and expansion of air are not to be foreseen, and the net effect takes place near the surface of the molten glass, which is at varying distances from the blow-pipe. In my apparatus, I control the air not at the inlet but from the outlet, and render the control more certain and immediate and otherwise efficient by the use of an exhaust pump. Incidentally, this permits of collapsing the cylinder after the drawing is finished in order to more efficiently effect the severing of the same from the glass in the drawing vessel.

In the drawings, I represent any convenient form of frame 8 which stands over the position of the drawing vessel represented at 9, and supports at the top a drum 10 and mechanism for raising the blow-pipe by means of a cable 11 or otherwise. The drum 10 may be driven by reduction gears 12 and a motor 13 on the platform 14 of the frame. Also on this platform, and geared up with the drum 10 by gears 15, I mount two grooved drums 16 which are made hollow, connected with fixed air pipes 17 and 18, and with flexible air pipes 19, 20, which are wound thereon in grooves, and which are connected to and from the blow-pipe and cylinder.

On the frame 8, I mount a pair of vertical ways 21 in which travels a vertically moving carriage 22 supporting a blow-pipe head 23 in which is mounted the blow-pipe 24. The blow-pipe head 23, as shown in Fig. 5 is fixed in brackets 22ª, and carries a connecting tube 25 which slides therein against the tension of spring 26 (Fig. 1) and has a forked head 27 connected to the air pipes 19 and 20.

As more clearly shown in Fig. 3, the sliding feed-pipe 25 has some play in the head 23 and at the bottom has a socket 28 in which fits a rounded and shouldered head 29 of a blow-pipe 24. This head or flange of the blow-pipe rests upon a slotted ledge 30 and the weight of the feed-pipe 25 resting thereon makes a joint between the blow-pipe and feed-pipe 25. The head 23 slides in the brackets 22ª of the carriage 22, but at the base a projecting fork 31 is provided to engage the flanged head 32 on the stem of a heat retaining hood 33, which is held in place by guides 34 and clip springs 35. It will thus be seen that when the carriage is down and the cable 11 is slack, the blow-pipe 24 will project below the hood 33 and when the blow-pipe is drawn up after forming the head or cap of the cylinder 7, this cap recedes into the hood 33, whereupon the head 32 thereof will strike the bottom of the head 23 and thereafter carry up the blow-pipe and the hood together. This allows the blow-pipe to be dipped into the glass while the hood is some distance therefrom, and as soon as the cylinder cap is formed, the hood automatically takes its place thereover to preserve the heat and insure against the cylinder breaking off of the blow-pipe.

From any convenient source (such as the pump 17ª shown in dotted lines in Fig. 1) I supply air under pressure to the air-pipe 17 and this may be regulated by a valve 36, having a dial graduated to indicate the pressure by the relation of the opening to the indicated pressure at the air pump on pipe 17; through this pipe 17, the air passes down through the flexible pipe 19 into the head 23 as shown in Fig. 3 and thence to the blow-pipe and cylinder. At the same time, through the flexible pipe 20, the fixed pipe 18 and valve 37, I exhaust the air by means of an exhaust pump 38, or other convenient means. By the dialed valve 37, I regulate the pressure in the cylinder being drawn. That is, the air pressure is controlled by the speed with which it is drawn out, the valve 37 of course being open less than the valve 36.

It is well known that glass cylinders while being drawn are extremely sensitive to changes in the internal air pressure, and that a very slight change of such pressure will either cause a swelling or collapsing movement of the cylinder. The valve 37 is set at about the right point, and its setting is changed by the operator as he may determine to be necessary by observation of the cylinder being drawn. For instance, in case he observes that there is excess of pressure within the cylinder which is causing it to bulge, he increases the opening of this valve. This gives an increased escape of air within the cylinder; and since the body of air within the cylinder is confined, the escape of air from any portion thereof effects a reduction in the interior pressure throughout the entire body of such confined air. There is, therefore, an equalized reduction of pressure; and by reason of the action of the exhaust pump, this decreased pressure is immediately felt. That is to say, the air does not have to escape against the pressure of the external atmosphere, as is the case with the simple vent opening to the atmosphere usually employed.

In order to properly control the drawing operation, it is at times necessary to very quickly change the internal pressure. This is made possible by my invention.

The outlet of the pump 38 can of course connect with the other pump for supplying air to pipe 17, (as indicated by dotted lines in Fig. 1) if desired, and thus I avoid waste of air pressure. It will be observed that when the outlet from the cylinder supplying conduit is direct to the air, the head against which the air is being pumped is neither to be foreseen nor possible of regulation since the internal pressure within the cylinder is subject to wide changes; whereas by my device, the air being pumped in is working against a head which is under complete control by the vacuum pump 38 and valve 37.

Whatever may be the distance of the drawing carriage from the drum 16, the air conduit remains of constant volume, and thus I avoid the irregularities and uncertainties of telescoping pipes, etc. These flexible pipes are preferably protected from the heat of the furnace by shield 39 on the head 27. The blow-pipe as here constructed, may be cleaned in the usual way, since the hood 33 on the stem thereof may be drawn back out of the way, and this arrangement is also convenient for the purpose of heating the hood at the same time, but to a less degree, than the blow-pipe is heated. It will be understood that the blow-pipe is automatically disconnected from the feed-pipe 25 by the act of taking down the cylinder, swinging its bottom outward until the flanged head 29 comes off the slotted bracket 30, in the usual well known way.

The operation will be clear from the above description. That is, the blow-pipe 24 and hood 33 having been heated, are hung in place on the brackets 30 and 31; the carriage being lowered, the bait is dipped into the pot of glass 9 until the glass adheres, at which time the hood 33 is elevated as in Figs. 1 and 3. The valve 36 being opened, air is introduced slowly until the cap is formed as the carriage rises by the action of motor 13 and hoisting cable 11. By the time the cap is formed it is drawn within the hood 33 and thereafter the hood rises with it. Meantime the air flows in through flexible pipe 19 and out through flexible pipe 20, being preferably controlled by the valve 37 whose dial will show the position necessary for the particular size of cylinder being drawn. When the cylinder has attained a proper length, the valve 37 may be thrown wide open and the suction will collapse the cylinder to small dimensions at the bottom where it is soft, so as to render severing it easy and leaving a comparatively small amount of cold glass in the pot.

The advantages of maintaining a constant flow of air, of regulating the air pressure by the outlet valve on the suction side, of keeping all the volume of the air conduit constant, and of automatically placing the heat retaining hood, and other advantages will be apparent to those familiar with the art.

Having thus described my invention and illustrated its use, I claim:

1. In glass drawing apparatus, a blow-pipe, means for supplying air under pressure to said pipe, and an air exhausting device also connected to said pipe, substantially as described.

2. In glass drawing apparatus, a blow-pipe having one connection to a source of air at a pressure greater than atmospheric pressure, and another connection in which less than atmospheric pressure is maintained, together with means for separately controlling the flow through said connections, substantially as described.

3. In glass drawing apparatus, the combination with a drawing carriage, a blow-pipe, and lifting means for the blow-pipe, of a flexible pipe for feeding air to the blow-pipe, another flexible pipe for withdrawing air therefrom, a winding drum for each of said pipes, a source of air supply connected to one of the flexible pipes through one of said drums, an exhausting device connected to the other flexible pipe through the other drum, together with means for simultaneously actuating the drums, substantially as described.

4. Glass drawing apparatus comprising a bait or blow-pipe having means for supplying air under pressure to the interior of the cylinder being drawn, and also having a vent opening, an exhaust pump connected to said vent opening, and means for regulating the size of said vent opening, substantially as described.

5. The herein described improvement in drawing glass cylinders, which consists in forcing air into the cylinder during the drawing operation, positively exhausting a portion of the air supply coming into the cylinder before the air reaches the cylinder, to thereby regulate the internal air pressure, and controlling the amount of air sucked out independently of the amount of air supplied, substantially as described.

In testimony whereof I have hereunto signed my name in the presence of the two subscribed witnesses.

LINCOLN A. $\overset{\text{his}}{\times}$ THORNBURG.
mark

Witnesses:
CLARA THORNBURG,
CHAS. S. LEPLEY.

Copies of this patent may be obtained for five cents each, by addressing the "Commissioner of Patents, Washington, D. C."